United States Patent
Holen

[15] 3,659,517
[45] May 2, 1972

[54] FRYING APPARATUS FOR FOODSTUFFS WHICH ARE TO BE FRIED ON BOTH SIDES

[72] Inventor: Kolbein Holen, Gaseid 5, 6000 Alesund, Norway

[22] Filed: Oct. 22, 1970

[21] Appl. No.: 83,107

[52] U.S. Cl. .................................99/355, 99/386, 99/423, 99/443 C
[51] Int. Cl. ..........................................A47j 37/00
[58] Field of Search....................99/355, 352, 386, 395, 397, 99/400, 423, 425, 427, 443 C

[56] References Cited

UNITED STATES PATENTS

| | | | |
|---|---|---|---|
| 2,112,309 | 3/1938 | Santillan | 99/355 |
| 2,902,921 | 9/1959 | Brodrick | 99/355 X |
| 3,225,716 | 12/1965 | Krooss et al. | 107/57 |
| 3,256,803 | 6/1966 | Nelson | 99/386 X |
| 3,371,595 | 3/1968 | Peters | 99/400 X |

FOREIGN PATENTS OR APPLICATIONS

| | | | |
|---|---|---|---|
| 963,046 | 12/1949 | France | 99/355 |
| 1,267,228 | 6/1961 | France | 99/443 |

*Primary Examiner*—Billy J. Wilhite
*Attorney*—McGlew and Toren

[57] ABSTRACT

Frying apparatus for foodstuffs which are to be fried on both sides, comprising a plurality of endless frying bands disposed one above the other and passing over rollers, wherein the bands consist of a webbing which is coated on both sides with polytetrafluoroethylene (Teflon) or other substance having similar properties, and the underside of the bands are in direct contact with a heated base having a plane central portion and upwardly curved edge portions in the longitudinal direction of the band, and wherein the foodstuffs are turned at the transition from one band to the band lying therebeneath.

2 Claims, 2 Drawing Figures

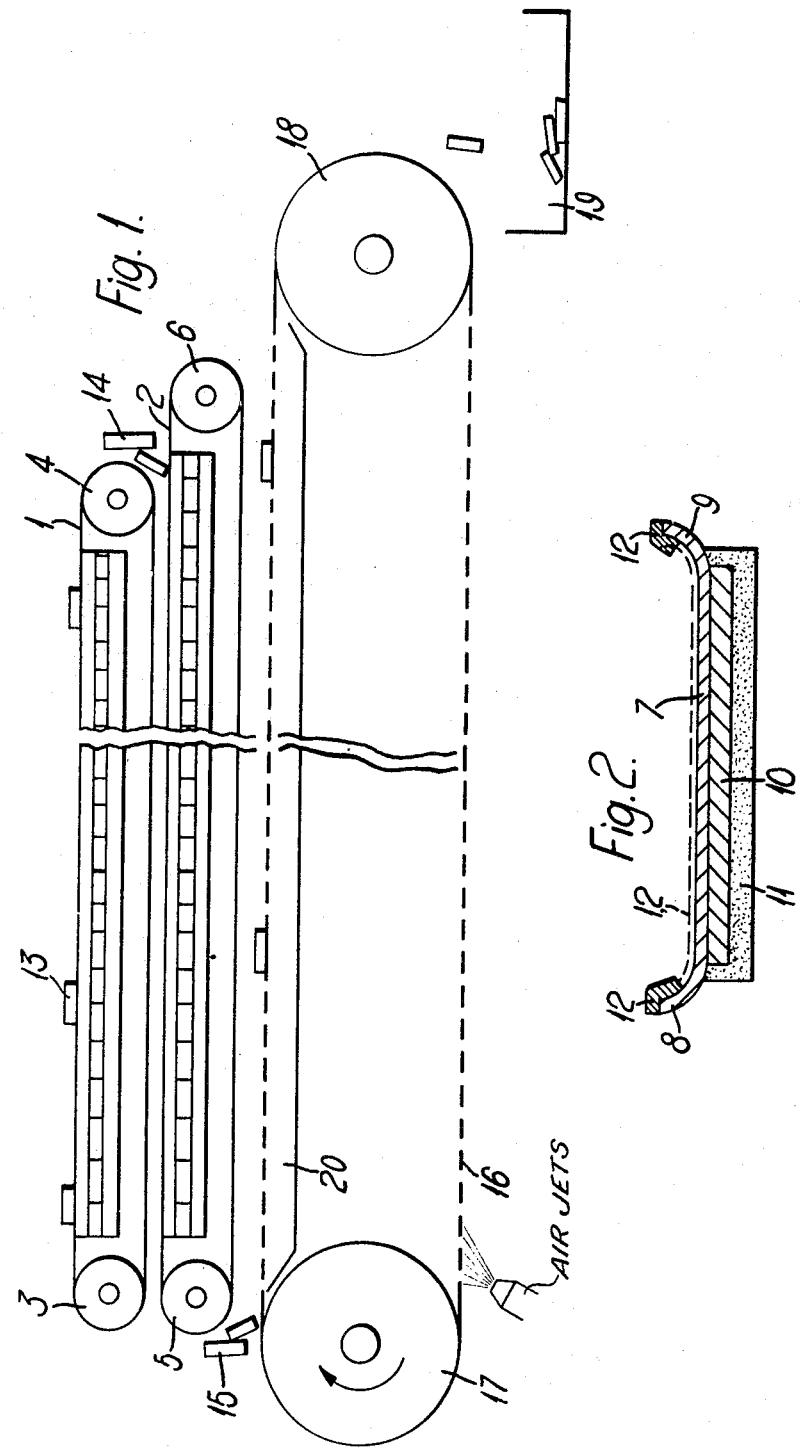

FRYING APPARATUS FOR FOODSTUFFS WHICH ARE TO BE FRIED ON BOTH SIDES

The present invention relates to a frying apparatus for foodstuffs which are to be fried on both sides, of the type comprising endless bands passing over rollers and located one above the other.

The frying apparatus according to the invention is primarily intended for frying of meat and fish products, such as fish cakes, meat cakes, fish and meat pieces.

Frying apparatus for frying of products are previously known, and comprise an endless band which passes over rollers, the foodstuff being fried upon the bands by means of heat supplied through the band. In the known apparatus, a thin steel band is used and the said band, during frying, passes with its upper portion through a bath of fat which is heated by an underlying heating element. The said known frying apparatus has been encumbered with a number of disadvantages and defects, inter alia, there is no possibility of a rapid adjustment of the frying temperature which gives rise to the problem of larger or smaller portions of burnt products. Despite the fact that large amounts of fat are used during frying the band as stated above passing through a bath of fat, foodstuff has stuck fast and been burnt to the band. The consequent constant cleaning of the band during operation, and particularly at the termination of a shift, entails great expense. In addition to the fact that the foodstuff is burnt fast to the steel band, the fat is also burnt fast in the material of the band, and the slag must be scraped off manually. This is time-consuming work and, when the apparatus is cleaned, it must once again be burnt-in with fat in order that the products in the next operation are able to leave the material in the band. The conditions under which frying takes place, namely that the foodstuffs swim in fat, limits the use of the frying apparatus since only special mincemeat products can be fried in such conditions. The best results are achieved by frying in conventional domestic frying pans and, by reason of the above said disadvantages of existing frying apparatus, many large concerns in the mean and fish branch are employing a great number of workers who fry the meat and fish products on large domestic frying pans. This is obviously irrational and very expensive. It has not been possible to provide frying apparatus which has operated satisfactorily, however.

From baking apparatus for bread products, it is known to arrange a plurality of endless baking bands one above the other where the bread products travel from one band and downwardly to another, the products being either turned at the transition from one band to another or brought downwardly onto the same baking side. It is not possible, however, immediately to convert such bread-baking apparatus to apparatus for frying of meat and fish. The bread-baking is carried out by indirect heating, that is to say a heated baking oven is used which is heated in a suitable manner.

The aim of the present invention is to provide a frying apparatus for foodstuffs which are to be fried on both sides, wherein the above said disadvantages of previously known frying apparatus of this type are avoided, in such a manner that it is possible to fry the foodstuff in a small amount of fat and the apparatus is readily kept clean so that expensive cleaning work of the apparatus is also avoided.

The invention is based upon the above described and known baking apparatus for bread products, and the purpose of the invention is achieved in that such an apparatus is characterized by bands consisting of webbing coated on both sides with polytetrafluoroethylene (Teflon) or other suitable material with similar properties; that the lower sides of the bands are in direct contact with a heated base surface having a plane central portion and upwardly curved edge portions in the longitudinal direction of the band, and that the foodstuffs are turned at the transition from one band to a band located therebeneath. A further feature of the invention resides in the provision beneath the frying bands of a similarly endless band of perforated webbing which runs over rollers and upon which the finished products fall, and in that beneath the upper portion of this band a tray is arranged onto which unabsorbed fat can run, and in that foodstuffs are cooled in known manner during transport on the band, for example, by means of jets of cold air.

By means of this embodiment of a frying apparatus for foodstuffs, it is possible to fry a larger number of various types of products. It is possible, practically speaking, to handle all types of products which are to be fried on both sides from fat-requiring foodstuffs to products which can be dry-fried, such as griddle cakes and crumpets. The apparatus is also simple and inexpensive to produce and simple and inexpensive to operate and clean. The frying bands are uninterrupted, that is to say they consist of a simple band in contrast to the previously known frying apparatus for the same type of products which utilize sectional conveyors where the frying plates are in the form of two-part, hinged aprons similar to a waffle-iron.

The invention is further explained in the following by means of the drawing, which in FIG. 1 shows in diagram form the frying apparatus viewed from the side, and where FIG. 2 is a section through one of the frying bands.

The frying apparatus according to the invention comprises two endless frying bands 1 and 2 of webbing, for example, glass fiber webbing, which is coated on both sides with teflon. The upper band 1 runs over rollers 3, 4 and the second band 2 is arranged beneath the first band and runs over rollers 5, 6. The upper portion of the bands 1, 2 are, with their lower sides, in direct contact with a heated base 7 which has upwardly curved edge portions 8, 9 running in longitudinal direction of the band. The base 7 is heated directly on the underside thereof by an electric heating element 10 which is insulated at 11 on the underside thereof and on the edges. The band 1, 2 lies flat upon the plane portion of the base 7 and upwardly at edges 8, 9 and is maintained in this position by means of curved edge beads 12 on both upwardly curved portions 8, 9 of the plate 7. The frying bands 1, 2 of the above described material are impermeable to fat, so that no fat appears on the underside of the upper parts, in other words downwardly towards the heated base 7. Any fat which is to be used during the frying remains upon the upper side of the band 1, 2, in the channel which is formed between the upwardly curved portions 8, 9 on the plate 7. Fat may be added during frying in such small amounts that the band is practically speaking dry when it runs over the end rollers 4, 5. The foodstuffs to be fried, for example, fish cakes 13, are laid upon the band 1 at the lefthand side of the drawing. The fish cakes are then fried on one side during travel on the band 1 to the end roller 4. The fish cakes 13 will then fall upon the band 2, the products being turned by means of a baffle 14 so that the side which is not fried is facing the band 2. During travel together with the band 2 to the roller 5, the products are fried on the other side thereof. At the end of the roller 5, a further baffle 15 is provided which ensures that the products fall down upon a further endless band 16 running over rollers 17, 18. The said band is made from perforated material, for example, a metal web, and conveys the finished products to a collecting box 19 for the finished products. During travel on the band 16 the products are cooled, for example, by means of air jets of cold air. Superfluous fat can run from the products down into a tray 20 which is located on the underside of the upper portion of the band 16.

The invention is not restricted to the embodiment example described hereinabove and illustrated on the drawing. Several stories of frying bands can be envisaged and the heating can take place in any suitable manner.

Having described my invention, I claim:

1. Frying apparatus for foodstuffs which are to be fried on both sides, comprising a number of pairs of spaced rollers, a plurality of endless frying bands disposed one above the other and each passing over a different said pair of rollers, characterized in that said frying bands consist of a webbing which is coated on both sides with polytetrafluoroethylene (Teflon), a heated base having a plane central portion and upwardly curved edge portions in the longitudinal direction of the band disposed in direct contact with the under side of each said band, and means located at the ends of said bands for turning foodstuffs at the transition from one said band to said band located below it.

2. Frying apparatus, as set forth in claim 1, characterized in that an endless cooling band is arranged beneath said frying bands, said cooling band consists of perforated webbing which runs over another said pair of rollers, said cooling band arranged to receive the ready-fried foodstuffs after their passage over said frying bands, a tray arranged beneath the upper portion of said cooling band for the collection of non-absorbed fat, and means for cooling the foodstuffs as they are transported upon said cooling band.

* * * * *